US008553664B2

(12) United States Patent
Bansal et al.

(10) Patent No.: US 8,553,664 B2
(45) Date of Patent: Oct. 8, 2013

(54) FIELD OPTIMIZED, CONFIGURABLE WIRELESS FIRE SYSTEM

(75) Inventors: Sameer Bansal, Bangalore (IN); Gourav Sharma, Bangalore (IN); Vinayak Sadashiv Kore, Bangalore (IN); Andrew G. Berezowski, Wallingford, CT (US)

(73) Assignee: Life Safety Distribution AG, Hegnau (CH)

( * ) Notice: Subject to any disclaimer, the term of this patent is extended or adjusted under 35 U.S.C. 154(b) by 398 days.

(21) Appl. No.: 12/976,430

(22) Filed: Dec. 22, 2010

(65) Prior Publication Data

US 2012/0163352 A1 Jun. 28, 2012

(51) Int. Cl.
*H04W 4/00* (2009.01)

(52) U.S. Cl.
USPC .......................................................... 370/338

(58) Field of Classification Search
USPC ................................................. 370/338, 328
See application file for complete search history.

(56) References Cited

U.S. PATENT DOCUMENTS

| 6,973,622 | B1 * | 12/2005 | Rappaport et al. ............. 715/735 |
| 2012/0185185 | A1 * | 7/2012 | Bae et al. ........................ 702/58 |

FOREIGN PATENT DOCUMENTS

WO  WO 02/27564 A1  4/2002

OTHER PUBLICATIONS

I. Marin et al., LL-MAC: A low latency MAC protocol for wireless self-organised networks, Microprocessors and Microsystems 32 (2008) pp. 197-209.
Liqi Shi et al., TDMA Scheduling with Optimized Energy Efficiency and Minimum Delay in Clustered Wireless Sensor Networks, IEEE Transactions on Mobile Computing, vol. 9, No. 7, Jul. 2010, pp. 927-940.
European Search Report and Annex, dated May 7, 2012, corresponding to Application No. EP 11 19 5365.

* cited by examiner

*Primary Examiner* — Mark Rinehart
*Assistant Examiner* — Ellen A Kirillova
(74) *Attorney, Agent, or Firm* — Husch Blackwell LLP

(57) ABSTRACT

A method and apparatus are provided for setting up a fire alarm system. The method includes the steps of coupling a user interface to a wireless fire detection system having a wireless gateway and a plurality of wireless fire detectors, receiving a selection through the user interface of a wireless transmission parameter used in transmitting messages between the wireless gateway and the plurality of wireless fire detectors, determining a latency time value associated with use of the received selection of the wireless transmission parameter in the transmission of messages between the wireless gateway and the plurality of fire detectors, displaying the calculated latency time value on the user interface and changing an operating mode of the plurality of wireless fire detection devices in accordance with the received selection. In addition to latency, the fire alarm system may receive a selection and determine the battery life and sensor/output device capacity that is possible and display these parameters for the benefit of a user.

20 Claims, 5 Drawing Sheets

FIELD OPTIMIZED, CONFIGURABLE WIRELESS FIRE SYSTEM

FIELD OF THE INVENTION

The field of the invention relates to fire detection systems and more particularly to methods of installing fire detection systems.

BACKGROUND OF THE INVENTION

Fire detection systems operate under any of a number of different operating modes. In one simple mode, a fire detection system may include a fire control panel hard wired to one or more fire detection devices (e.g., smoke sensors) and/or pull stations. In this case, the fire detection devices and/or pull stations may operate as simple contact closure devices that signal a fire by closing a contact. In this case, the control panel may detect the contact closure and sound a local alarm or transmit an alarm signal to a central monitoring station.

Other, more sophisticated fire detection systems may rely upon a set of radio frequency (rf) transceivers within both the control panel and each of the fire detection devices and/or pull stations. The transceivers within the fire detection devices and/or pull stations may be battery powered.

In a fire detection system that relies upon rf transceivers, the control panel and fire detection devices may each be assigned their own unique system address. During use and in the event of a fire, the fire detection devices and/or pull stations may transmit one or more messages directed to the system address of the control panel. The messages may include the system address of the originating fire detector or pull station and indication of the type of event (e.g., detection of a fire, manual activation of a pull station, etc.).

While such systems work relatively well, they are dependent upon the number of detectors/pull stations within the system. In large systems the delay in the transmission/reception of alarm messages may become excessive causing additional damage from excessive delays. Accordingly, a need exists for better methods of setting up and reducing the delays in such systems.

DETAILED DESCRIPTION OF AN ILLUSTRATED EMBODIMENT OF THE INVENTION

Figure 1:
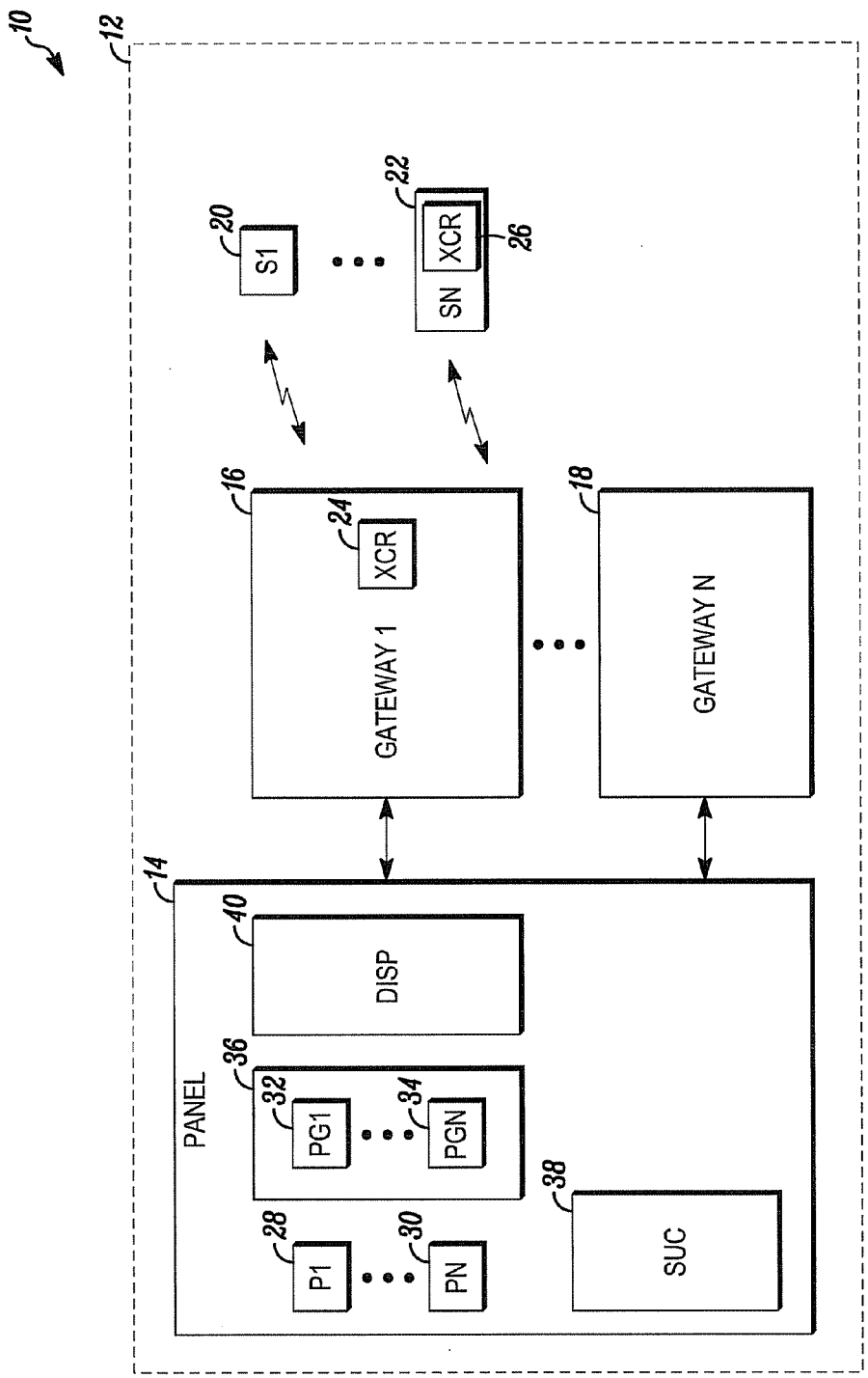
FIG. 1 is a block diagram of a fire detection system shown generally in accordance with an illustrated embodiment of the invention.

FIG. 1 is a block diagram of a control system (e.g., a fire detection system, security system, HVAC or other comfort system, etc.) 10 that protects a secured area 12 shown generally in accordance with an illustrated embodiment of the invention. Included within the system 10 may be a central control panel 14 coupled to one or more communication gateways 16, 18. Each of the gateways 16, 18 may be associated with a number of fire detector devices, pull stations and/or audible or visual annunciators (referred to hereinafter together as input and/or output devices) 20, 22. The control panel 14 communicates with each of the input and/or output devices 20, 22 through one of the gateways 16, 18.

The control panel 14, gateways 16, 18 and input and/or output devices 20, 22 may each be provided with and controlled by one or more programmed processors 28, 30. The processors 28, 30, in turn, may each operate under the control of one or more programs 32, 34 loaded from a non-transitory computer readable medium (memory) 36.

The gateways 16, 18 each have one or more rf transceivers 24 that communicate with a respective rf transceiver 26 within each of the input and/or output devices 20, 22. The format of information exchange between the gateways 16, 18 and input and/or output devices 20, 22 may be under any appropriate format. Under one preferred embodiment, the communication format is a time division multiplexed (TDM) format.

Included within each of the transceivers 24 or gateways 16, 18 may be a transmitting format file located within a memory of the transceiver. Included within the transmitting file may be a transmitting frequency, a transmitting format and a set of system identifiers. The set of system identifiers may include at least one system identifier associate with each gateway 16, 18 and a system identifier associated with each input and/or output device 20, 22.

The transmitting format may include a set of time references and a time duration for transmitting and receiving signals within the context of the time reference. For example, if the gateway 16 operates under a TDM format, then the set of time references may define the length of a frame and the duration of each transmitting and receiving slot within the frame. The transmitting format file may also provide the system identifier of each input and/or output device 20, 22 associated with each slot within the frame and a transmission speed within each slot in bits (or bytes) per second.

Alternatively, the gateways 16, 18 may operate in conjunction with one another within a common superframe. In this case, the transmitting format file of each gateway 16, 18 may define a respective location within the superframe in which each transceiver 24 (i.e., each gateway 16, 18) is intended to operate within the superframe.

During start up of the system 10 (or when ever communication is lost between the input and/or output device 20, 22 and a gateway 16, 18), the input and/or output device 20, 22 may randomly transmit registration messages. The closest gateway 16, 18 may detect the registration message and authenticate the transmitting input and/or output device 20, 22 as being part of the system 10. Upon completion of authentication, the detecting gateway 16, 18 may download the appropriate communication format file (or parts of it) to the input and/or output device 20, 22. The input and/or output device 20, 22 may decode the file to recover a set of transmission parameters. Decoded transmission parameters may include the frequency of transmission, the time reference and transmitting and receiving locations (slots) within that time reference. The decoded information may also include a transmission rate (in bits/second) and a system identifier of the gateway 16, 18 through which the input and/or output 20, 22 is to operate. The input and/or output 20, 22 may then synchronize to its assigned slot and begin exchanging information with the detected gateway 16, 18.

The gateways 16, 18 may periodically transmit a polling message to each of the input and/or output devices 20, 22. Each input and/or output device 20, 22 may detect its intended message based upon its location within the frame or superframe or by the destination address of the polling message.

The input and/or output devices 20, 22 may decode the polling message and compose a response. The response may include the system identifier of the input and/or output device 20, 22 and a current status of the input and/or output device 20, 22. If the input and/or output device 20, 22 includes an environmental sensor (e.g., temperature), then the input and/or output device 20, 22 may also incorporate a measured environmental parameter in the response.

The gateways 16, 18 may detect each response to the polling message and measure a signal parameter (e.g., a received signal strength indication (RSSI)). A signal strength processor within the gateway 16, 18 may compare the measured signal parameter with a minimum threshold in order to maintain a reserve signal strength margin through the radio frequency channel. If the link margin it too low, then the signal strength processor may send an instruction to the input and/or output device 20, 22 through a downlink channel to increase its transmission power. If the link margin is more than is necessary for good communication, then the signal strength processor may send an instruction to the fire detector to decrease its transmitting power.

In addition to sending polling responses, the input and/or output devices 20, 22 may also detect and report alarm conditions. In this case, a programmed processor 28, 30 within each of the input and/or output devices 20, 22 may measure an environmental parameter (e.g., temperature, smoke, gas, etc.) and compare the measured environmental parameter with one or more threshold values. In the event that the measured parameter exceeds the threshold value, then the input and/or output device 20, 22 may report an alarm.

Upon detecting an alarm, the input and/or output device 20, 22 may compose an alarm message for transmission to the alarm panel 14 through the gateway 16, 18. The alarm message may include the system identifier of the input and/or output device 20, 22, an identifier of the type of alarm (e.g., temperature, smoke, gas, etc.) and a destination system address (e.g., the address of the gateway 16, 18). The alarm message may also include one or more measured environmental parameters.

The input and/or output device 20, 22 may wait for the next polling request from the gateway 16, 18 or may transmit the alarm message immediately. In each case, the gateway 16, 18 may receive the message, determine that it is an alarm message and forward the message to the alarm panel 14.

The panel 14 may receive and decode the message. From the decoded information within the message, the alarm panel 14 may retrieve the system identifier of the input and/or output device 20, 22 and the alarm type. The alarm panel 14 may also recover a measured environmental parameter.

From the system identifier of the input and/or output device 20, 22, the alarm panel may be able to determine a location of the input and/or output device 20, 22 within the protected area 12. The alarm panel 14, in turn, may sound a local alarm and compose a message that is sent to a central monitoring station. The message to the central monitoring station may include a system identifier of the alarm panel 14, the location of the input and/or output device 20, 22, the type of alarm and a time that the alarm was reported. The central station may response by dispatching the appropriate authority.

In order to control set up and the overall operation of the system 10, a set up controller 38 and associated display and user interface 40 may be provided within the control panel 14 and/or within the gateways 16, 18. A human user may access one or more programmed processors 28, 30 operating within the set up controller 38 through the user interface 40 to define the number of input and/or output devices 20, 22, the gateways 16, 18 and how the input and/or output devices 20, 22 communicate with the alarm panel 14 through the gateways 16, 18.

Also included within the set up controller 38 may be one or more latency processors 28, 30 that calculate a latency time period associated with the set up of the system 10. In this case, the latency processors may be used to determine a latency time (and therefore a change in latency time) for each different configuration of input and/or output devices 20, 22 and communication configuration selected by the user and intended to be used by the system 10. The change in latency may be used to optimize one or more of at least latency and/or battery life of the wireless input and output devices In addition to the latency processors, the set controller 38 may also include one or more battery life processors that calculate a predicted battery life for the input and/or output devices 20, 22. In this regard, it has been found that the predicted battery life of the input and/or output devices 20, 22 may be indirectly tied to latency period and to the number of input and/or output devices 20, 22 used within the system 10.

In general, the latency time period for the alarm system 10 may be divided into three components. The first component is the maximum time period required for an input and/or output device 20, 22 to report an alarm to the gateway 16, 18. The second component is the time period required for the gateway 16, 18 to report the alarm to the alarm panel 14 and to receive activation information (e.g., the identifiers of any output devices, such as audible or visual alarms, to activate). The third component is the processing time required for the gateway 16, 18 to process the alarm from the input and/or output device 20, 22, to compose and transmit an alarm message to the control panel 14 and also the time for all output devices in the network 10 to receive activation information and to activate their outputs.

The setting up of the system 10 may be accomplished via one or more set up processors 28, 30 within the set up controller 38 of the control panel 14 and inputs received from the user through the display 40 or other user input devices (e.g., a keyboard) coupled to the set up controller 38. The gateways 16, 18 may be provided as "plug and play" devices. Upon attaching, a gateway 16, 18 to the control panel 14, the set up processors may recognize the gateways 16, 18 as a class of device that supports communication with a number of input and/or output devices 20, 22. In response, the set up processors within the set up controller 38 may download an operating system to each gateway 16, 18 that supports such functionality. Alternatively, the gateways 16, 18 may contain its own operating system located within a memory 30 of the gateway 16, 28.

In either case, once activated, the operating system within the gateways 16, 18 may set up the transceiver 24 to communicate under a TDM (or some other) basis with external devices and form the necessary data structures in support thereof. Upon connection with the control panel 14, an alarm processor of the control panel may form a communication connection with a communication processor associated with the transceiver 24 of each of the gateways 16, 18.

The communication processor within each gateway 16, 18 may also prompt the user through the set up controller 38 and display 40 to define a communication format and to identify a set of input and/or output devices 20, 22 that are intended to communicate through each gateway 16, 18 under that format. The user may enter the number of input and/or output devices 20, 22 that are to communicate with each gateway 16, 18. The user may also enter a system identifier for each input and/or output device 20, 22. Alternatively, the gateways 16, 18 may engage in an automatic discovery process where the gateway scans a predefined frequency to detect the input and/or output device 20, 22 closest to that gateway 16, 18 and to automatically assign system identifiers to each input and/or output device 20, 22.

Where the system 10 includes more than one gateway 16, 18, the user may simply assign a frequency for use by each gateway 16, 18 and the number of input and/or output devices 20, 22 to be used by the respective gateways 16, 18. In response, a set up processor within the set up controller 38 may automatically define a superframe to be used among the gateways 16, 28. In this case, a set of time references within the superframe may be defined for each gateway 16, 18 by the set up processor based upon the number of fire detectors assigned to the gateway. The set of time references are incorporated into the respective transmitting format file that is, in turn, downloaded to each gateway 16, 18.

Alternatively, the set up processor may create a superframe and present the parameters of the superframe to the user for review and revision. The superframe created by the set up processor may be defined by a time period for repetition of the superframe, a frame used by each gateway 16, 18, a number of slots in each frame and a time length of each slot. The user may revise and implement the superframe as appropriate.

Implementing the superframe in this case involves downloading the transmitting format file to each gateway 16, 18. The gateways 16, 18, in turn, execute the superframe defined by the respective transmitting format file.

As the set up processor creates each superframe and transmitting format file, the latency processor and battery life processor may calculate an alarm reporting latency and battery life based upon each frame, superframe and change made by the user through the set up controller 38. It should be noted in this regard that fire regulations and insurance requirement may require different minimum latency in the reporting of alarms from input and/or output devices 20, 22. Moreover, those requirements differ from state to state and country to country. It should also be noted that battery life is implicated by changes in latency.

For example, latency may be reduced to increasing a data transmission rate of each input and/or output device 20, 22. The increased data transmission rate can be used to reduce the time of each superframe. However, the increased data transmission rate requires more power and can reduce a battery life of each input and/or output device 20, 22 to the point that it is impractical to operate the system 10 at that latency level.

On the other hand, the battery life of at least some input and/or output devices 20, 22 may be increased by using two or more gateways 16, 18 and distributing the gateways 16, 18 throughout the protected area 12. This has the benefit of reducing the transmission power level of each input and/or output device 20, 22 and extending the battery life.

Figure 2:
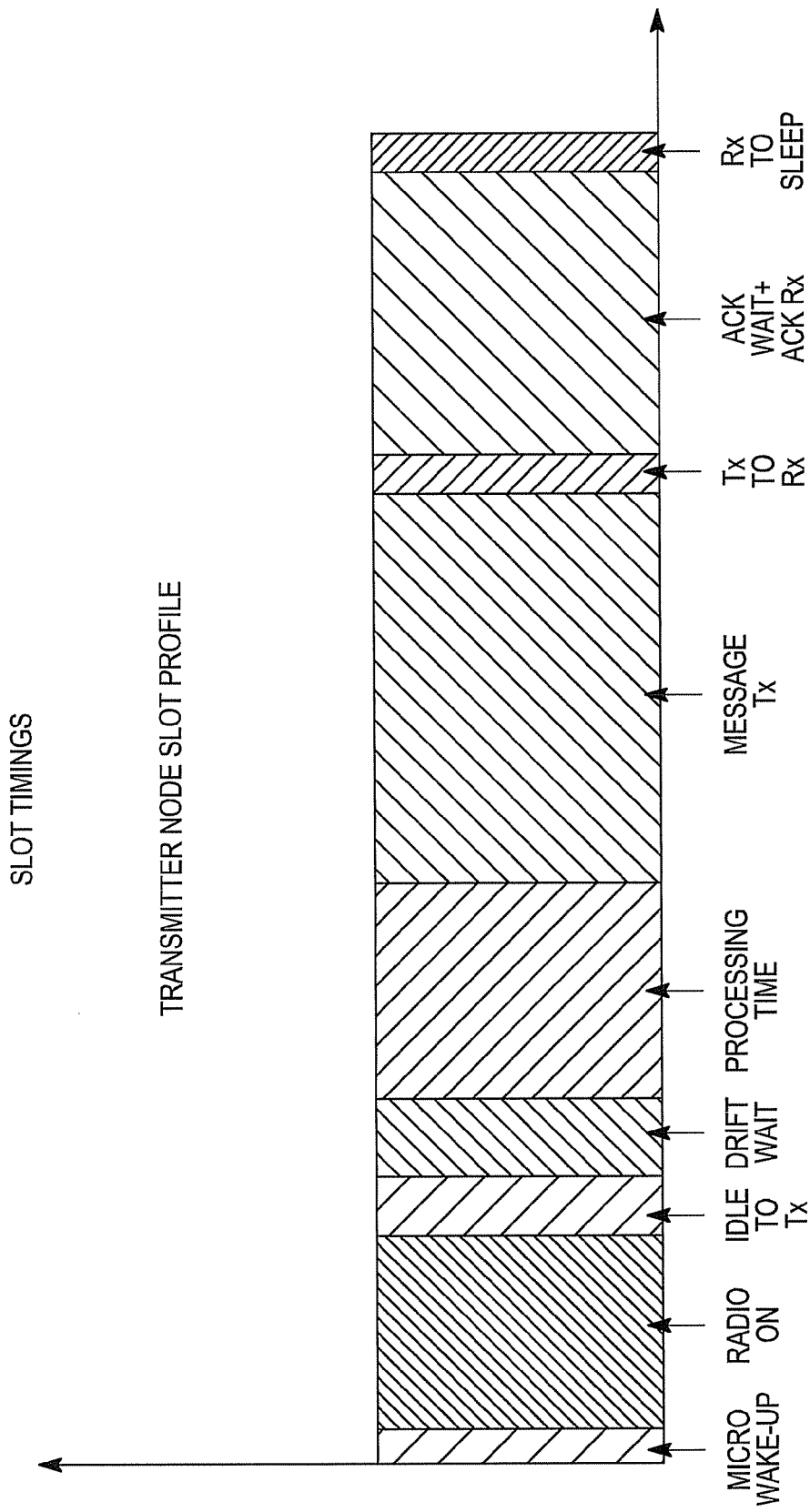
FIG. 2 depicts a transmission profile that may be used by the system of FIG. 1.

FIG. 2 depicts a timing profile of a transceiver 26 of an input and/or output device 20, 22. The timing profile of FIG. 2 defines a minimum set of operating characteristics of one conventional, commercially available transceiver (e.g., a Semtech model XE1205 transceiver).

Table I compares the operating characteristics of the Semtech model XE1205 radio with an Atmel model RF212 radio.

TABLE I

| Broad category | Time Component | Atmel RF212 based implementation (in ms) | Semtech XE1205 based implementation (in ms) |
| --- | --- | --- | --- |
| Radio dependant parameters | Radio Wake-Up | 240 | 1000 |
| | Idle to Tx | 20 | 250 |
| | Idle to Rx | 110 | 700 |
| | Rx-Tx | 1 | 100 |
| | Tx-Rx | 1 | 100 |
| Data Rate dependant parameters | Message Tx (32 Nodes) | 1952 | 6354.167 |
| | Ack Tx | 800 | 2604.167 |
| Security dependant | Authentication Time | 500 | 1500 |

As can be seen from Table I, the Atmel transceiver offers a much different set of operating characteristics than the Semtech radio.

Using the data of Table I and data from other sources, a set of operating characteristics of the transceivers 26 can be developed and saved into a transceiver time delay look up table that is saved into the control panel 14. This data can be combined with a required data transmission rate of the input and/or output devices 20, 22 to provide a further look up table of time delays for each radio type and transmission rate.

Figure 3:
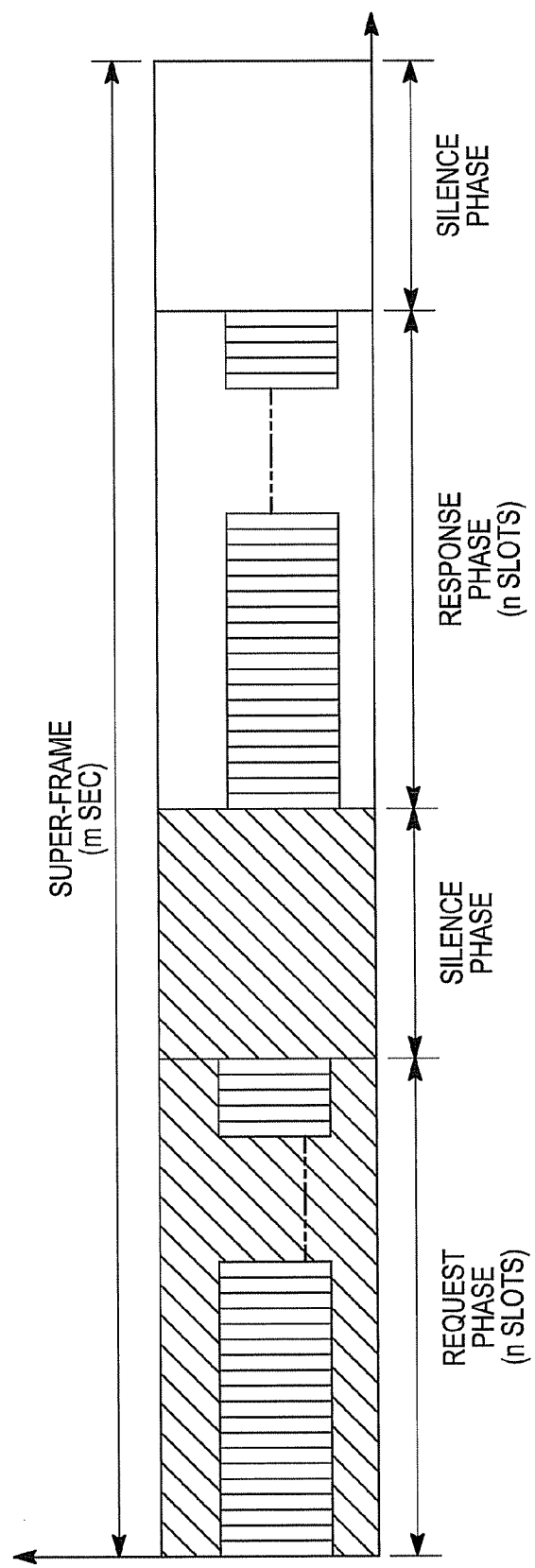
FIG. 3 is a superframe that may be used by the system of FIG. 1.

FIG. 3 depicts a superframe that may be defined by the set up processor. As shown, the superframe may include a request phase where the gateway 16, 18 sends a message (polls) each of the input and/or output devices 20, 22 and a response phase where each of the input and/or output devices 20, 22 transmits a response to the gateway 16, 18. The request phase may be separated from the response phase by a silent phase.

The silent phase may be used for any of a number of different purposes based upon the set up of the system 10. For example, the silent phase may be a time interval where the control panel 14 polls the gateway 16, 18 for alarm information.

Alternatively, and in the case where only a single gateway 16, 18 is present within the system 10, the silent phase may be used by any input and/or output device 20, 22 that has lost synchronism with the gateway 16, 18 to transmit a registration message and to re-register with the gateway 16, 18. In the case where more than one gateway 16, 18 is present, then FIG. 3 may be used to represent the activity of one gateway 16, 18 and where the silent phase is used by another gateway 16, 18 for a corresponding request and response phase.

Figure 4A:
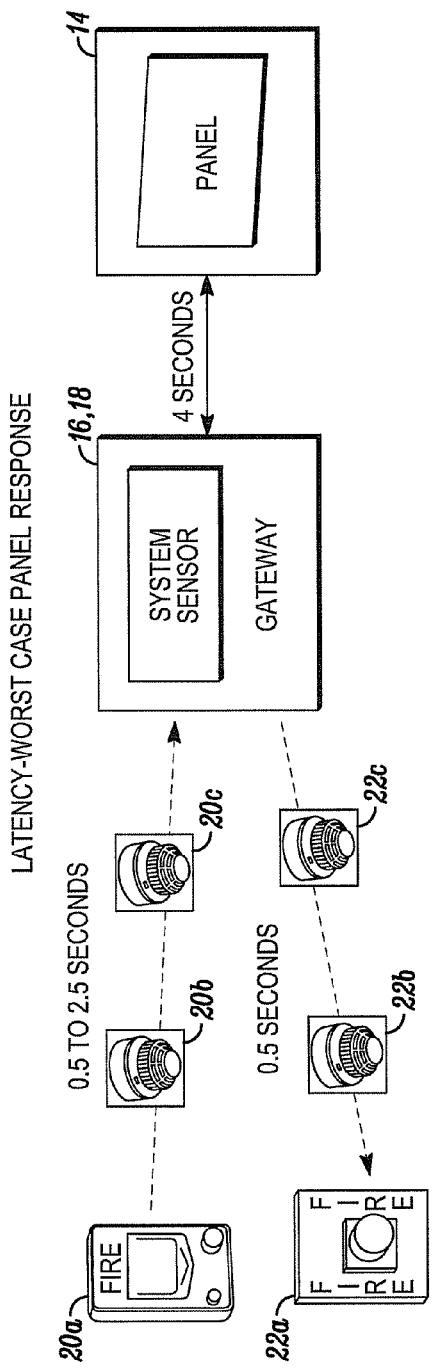
FIGS. 4A-B depict node operation that may be used by the system of FIG. 1.
Figure 4B:
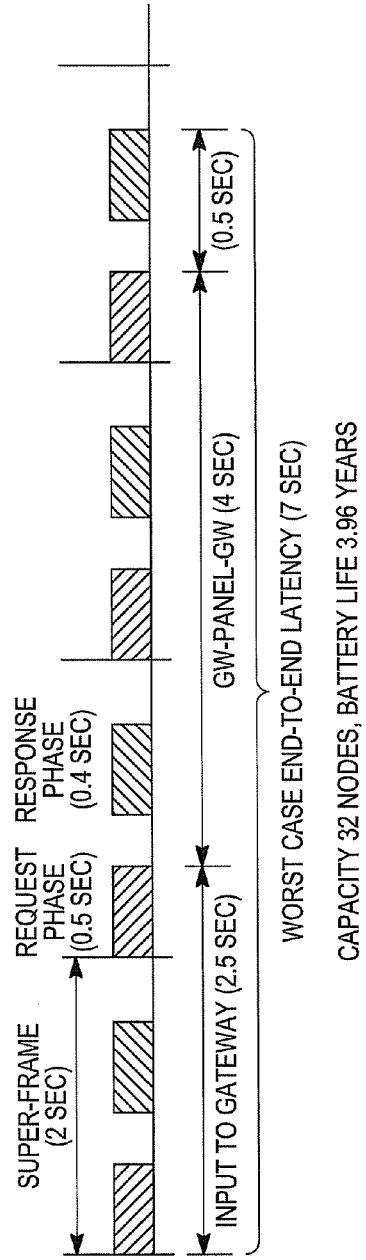

FIGS. 4A-B represent a particular scenario presented by the set up processor for transmission of a alarm signal to the alarm panel 14. In this regard, FIG. 4A represents a situation where the input and/or output devices 20, 22 operate in a master slave relationship. In FIG. 4A, three fire detectors 20a, 20b, 20c operate in an area where fire detector 20b also transceiver (i.e., repeats) a signal between pull box 20a to the gateway 16, 18 through fire detector 20c. Similarly, three fire detectors 22a, 22b, 22c operate in another area where fire detector 22b also transceivers a signal between output device 22a and gateway 16, 18 through fire detector 22c. As shown in FIG. 4A, the latency time delay for fire detectors 20a-c ranges from 0.5 to 2.5 seconds depending upon the signal source. Similarly, fire detector 22a-c has a latency time delay of 0.5 seconds to receive an alarm from devices 22b, 22c and to activate an audible/visual alarm 22a.

The delay of 0.5 to 2.5 seconds for fire detectors 20a-c is based upon worst case condition where the pull box 20a is activated during a part of the superframe where the alarm will not be detected until the next superframe. In this case, the alarm from pull box 20a must be repeated through alarms 20b, 20c before arriving at the gateway 16, 18 (and, then, detection during the next superframe).

In the case of devices 22a-c, worst case occurs in the case of an alarm detected by sensor 22b (and repeated through sensor 22c) before receipt by the gateway 16, 18. The delay in the repeated signal from sensor 22b is added to another delay for transmission of the activation alarm to output device 22a in order to arrive at the maximum delay of 0.5 seconds.

These latency time delays may be calculated by the latency processor based upon the communication connections between the gateways 16, 18 and input and/or output devices 20, 22. Alternatively, the latency processor may measure the latency via test signals transceived through each chain defined by the gateways 16, 18 and input and/or output devices 20, 22.

FIG. 4B depicts a timing diagram of the gateway 16, 18. In this case, since the longest latent time delay is 2.5 seconds, then the worst case time delay for the input and/or output device 20, 22 detected by the latency processor is 2.5 seconds. Similarly, FIG. 4B also shows that the time delay for transmitting the alarm from the gateway 16, 18 to the control panel 14 and a response back to the gateway 16, 18 is 4 seconds. The processing time for the response within the gateway 16, 18 is another 0.5 seconds to provide an overall worst case latency in this case of 7.0 seconds.

The battery life processor may also receive and process the data shown in FIGS. 4A-B in order to estimate a battery life. In the situation of FIGS. 4A-B, the gateway 16, 18 may include 32 nodes 20a-c, 22a-c. In this case, the estimated battery life for each of the input and/or output devices 20, 22 may be 3.96 years.

Figure 5:
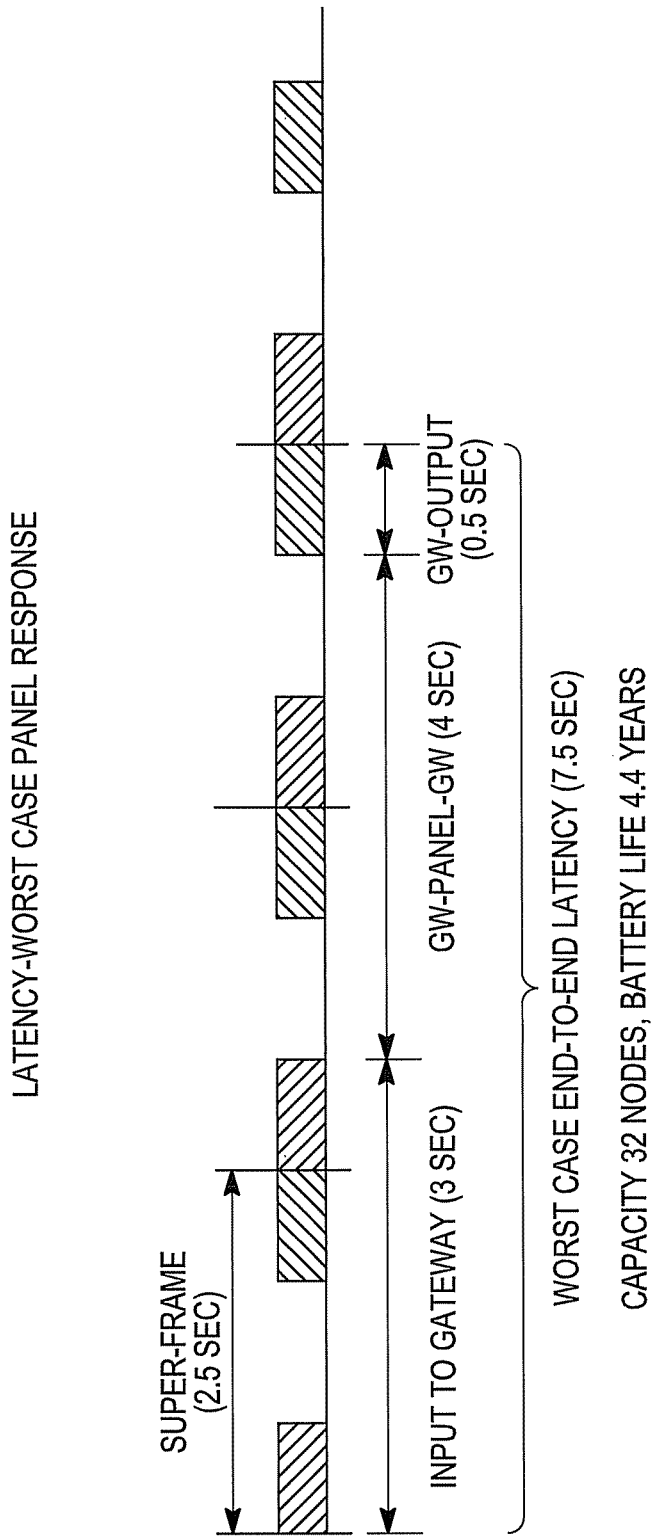
FIG. 5 depicts a further example of FIG. 4B.

FIG. 5 shows a time sequence of the gateway 16, 18 of FIG. 4A where the user has adjusted a transmission parameter (e.g., reduced a data transmission rate of the input and/or output devices 20, 22) and increased the superframe time period to 2.5 seconds. In this case, the latency of the input and/or output devices 20, 22 has been increased and the overall worst case latency has been increased to 7.5 seconds. However, the battery life has been increased to 4.4 years.

Simulations reveal that, if the superframe time period is increased to 3 seconds, then the overall worst case latency time period becomes 8 seconds and the estimate battery life becomes 4.76 years. Alternatively, this process can be continued to consider a number of possible scenarios: 1) where the superframe time period is increased to 4 seconds, then the overall worst case latency time period becomes 9.7 seconds and the estimate battery life becomes 5.09 years; 2) where the superframe time period is increased to 5 seconds, then the overall worst case latency time period becomes 10 seconds and the estimate battery life becomes 5.69 years.

Alternatively, for the 32 node gateway of FIG. 4A, the superframe can be reduced to one second by increasing the transmission rate of the input and/or output devices 20, 22 and compensating by decreasing the polling interval to 8 seconds. In this case, the estimated battery life becomes 4.76 years.

In other alternatives, the system 10 may operate without synchronization of responses. In other words, the superframe includes a request phase, but these is no predefined response phase. The input and/or output devices 20, 22 transmit an alarm message immediately upon detection.

In this case, it may be assumed that the end-to-end latency is 10 seconds, the latency of the gateway to panel to gateway is 3.838 seconds and the superframe may be 2 seconds long. For a 32 node system, the latency of the fire detectors would be 4.95 seconds and the estimated battery life would be 3.95 years. In other scenarios: 1) for a 50 node system with a 2 second superframe, the latency of the fire detectors would be 5.6 seconds and the estimated battery life would be 3.83 years; 2) for a 56 node system with a 2 second superframe, the latency of the fire detectors would be 5.85 seconds and the estimated battery life would be 3.81 years and 3) for a 32 node system with a 2.5 second superframe, the latency of the fire detectors would be 6.0 seconds and the estimated battery life would be 4.40 years.

In still other examples, a 32 node system may have communication super frame of 4 seconds and an alarm detection to alarm output activation latency time of 10 seconds. In this case, the battery life would be 5 years.

Alternatively, a 50 node system may have communication super frame of 3 seconds and an alarm detection to alarm output activation latency time of 10 seconds. In this case, the battery life would be 4 years.

In another example, a 32 node system may have communication super frame of 2.5 seconds and an alarm detection to alarm output activation latency time of 7 seconds. In this case, the battery life would be 4 years.

In still another example, a 32 node system may have communication super frame of 2 seconds and an alarm detection to alarm output activation latency time of 5 seconds. In this case, the battery life would be 3 years.

These examples demonstrate the effects of different combinations of latency versus battery life. The later examples suggest that a better battery life may be achieved by higher latency or at the cost of capacity.

In general, the system 10 includes a wireless fire reporting system and user interface 40 and set up controller 38 for configuration. Within the user interface various parameters may be selected to optimize or trade off performance criteria. A number of programs 32, 34 within the user interface provide the user with real time information with respect to how each selection affects each of the performance criteria. Alternatively, the system 10 may provide a menu of variable options within the constraints of regulatory agency requirements for maximum latency. The system 38 may indicate if any of the parameters are outside achievable limits.

Once the system 10 is configured through the user interface, the data is transferred to the wireless portion of the system 10 where each of the nodes employs one or more programs 32, 34 to modify slot durations, packet formats, transmit power, duty cycle, parent-child relationships and redundancy parameters, mesh synchronization, data rate, and network management messages to achieve the system performance parameters specified. In the event that subsequent changes are necessary, the process may be repeated.

The set up controller 38 allows flexibility to users. IF a user wants better than regulation required latency, this can be accomplished by rearranging or adding gateways or adjusting other parameters. Alternatively, if the user wants more battery life at the expense of latency, this can also be accomplished. All of these features can be made configurable and selectable at the node level in the field. Programs 32, 34 within the set up controller may automatically adjust additional system parameters that may be inaccessible for use selection but necessary to complete the system optimization.

The features that can be optimized include the system capacity at the expense of battery life and latency. Alternatively, latency can be optimized at the expense of battery life and capacity. Other parameters that can be optimized include: frequencies, channels and transmit power. Further parameters that can be traded include: battery life, at the expense of latency, power and system capacity; power at the expense of transmission range; frequency/channel subsets to avoid conflict with other systems present at the site; quantity of data transferred to and from wireless nodes; periodic rate of data updated; reserve signal strength link margins; system security parameters including keys and security levels; alarm decision-making location (at the panel or at the sensor); available battery capacity and chemistry; the fault indication thresholds (e.g. low battery threshold); rf transceiver parameters (e.g., adjacent channel rejection, data rate, transmit and receive durations, etc.); wireless group ID to prevent conflict with coexisting system groups; panel compatibility parameters of the signaling line circuit; mesh network parameters including levels of redundancy; parent-child relationships and operating modes which may be specific to the application and/or parameters of the intended installation environment (e.g., temperature, humidity, etc.).

In general, the system 10 allows common firmware on all devices regardless of optimization choice, and allow devices to be reconfigured in the field. In addition, the single firmware design aids in easily migrating nodes to different networks.

A specific embodiment of method and apparatus for setting up fire systems has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
coupling a user interface to a wireless control system having a wireless gateway and a plurality of wireless input and output devices wherein the wireless gateway and each of the plurality of wireless input and output devices is located within and protects a secured area, where at least one input device of the plurality of wireless input and output devices detects fires and wherein at least one of the plurality of wireless input and output devices communicates with the wireless gateway through another of the plurality of wireless input and output devices;
receiving through the user interface a selection of a wireless transmission parameter used in transmitting messages between the wireless gateway and at least some of the plurality of wireless input and output devices;
determining a latency time value of messages transmitted between the wireless gateway and each of the plurality of input and output devices based upon use of the received selection of the wireless transmission parameter;
displaying the calculated latency time value on the user interface; and
changing an operating mode of the plurality of wireless input and output devices in accordance with the received selection to optimize one or more of at least latency and battery life of the wireless input and output devices where the changed operating mode includes a latency time that is less than a predetermined maximum latency between the wireless control system and each of the plurality of input and output devices including the at least one device that communicates through the other of the plurality of wireless input and output devices.

2. The method as in claim 1 further comprising calculating and displaying an overall worst case latency defined by a greatest relative delay among respective signals originating from the plurality of wireless input and output devices and a control panel of the wireless control system.

3. The method as in claim 2 further comprising defining the overall worst case latency based upon a wireless input and output device to gateway latency time, plus a gateway to control panel to gateway latency time plus a gateway processing time.

4. The method as in claim 2 wherein the overall worst case latency further comprises a time period of a communication superframe between the control panel and each of a plurality of gateways.

5. The method as in claim 1 further comprising calculating a battery life of at least some of the plurality of wireless input and output devices based upon the received selection.

6. The method as in claim 1 wherein the received parameter further comprises the number of wireless input and output devices operating through the gateway.

7. The method as in claim 1 wherein the received parameter further comprises a transmission rate in bits per second of each of the plurality of wireless input and output devices operating through the gateway.

8. The method as in claim 1 wherein the received parameter further comprises a transmission power of at least some of the plurality of wireless input and output devices operating through the gateway.

9. The method as in claim 1 wherein the received parameter further comprises a periodic rate of data update between each of the plurality of wireless input and output devices and the gateway.

10. The method as in claim 1 wherein the received parameter further comprises a reserve signal strength link margins between each of the plurality of wireless input and output devices and the gateway.

11. The method as in claim 1 wherein the received parameter further comprises security system parameters including keys and security levels of each of the plurality of wireless input and output devices operating through the gateway.

12. An apparatus comprising:
a user interface coupled to a wireless fire detection system having a wireless gateway and a plurality of wireless input and output devices wherein the wireless gateway and each of the plurality of wireless input and output devices is located within and protects a secured area, where at least one input device of the plurality of wireless input and output devices detects fires and wherein at least one of the plurality of wireless input and output devices communicates with the wireless gateway through another of the plurality of wireless input and output devices;
a selection received through the user interface of a wireless transmission parameter used in transmitting messages between the wireless gateway and at least some of the plurality of wireless input and output devices;
a latency time value that is associated with use of the received selection of the wireless transmission parameter in the transmission of messages between the wireless gateway and the plurality of input and output devices;
a display that displays the calculated latency time value on the user interface; and
an operating mode of the plurality of wireless input and output devices that is implemented in accordance with the received selection to optimize one or more of at least latency and battery life of the wireless input and output devices where the implemented operating mode includes a latency time that is less than a predetermined maximum latency between the wireless fire detection system and each of the plurality of input and output devices including the at least one device that communicates through the other of the plurality of wireless input and output devices.

13. The apparatus as in claim 12 wherein the selection further comprises a number of input and output devices coupled to the wireless gateway.

14. The apparatus as in claim 12 wherein the wireless gateway further comprises a plurality of wireless gateways.

15. The apparatus as in claim 13 wherein the selection further comprises a number of fire detection devices coupled to each of the plurality of wireless gateways.

16. An apparatus comprising:
a wireless safety, security and comfort system having a wireless transceiver and a plurality of wireless input and output devices wherein the wireless transceiver and each of the plurality of wireless input and output devices is located within and protects a secured area, where at least one input device of the plurality of wireless input and output devices detects fires and wherein at least one of the plurality of wireless input and output devices communicates with the wireless transceiver through another of the plurality of wireless input and output devices;
a user interface coupled to the wireless safety, security and comfort system;
a selection received through the user interface of a wireless transmission parameter, the selection used in transmitting messages between the wireless transceiver and at least some of the plurality of wireless input and output devices;
a latency processor that determines a latency time value that is associated with use of the received selection of the wireless transmission parameter in the transmission of messages between the wireless transceiver and the plurality of input and output devices; and
a display that displays the calculated latency time value on the user interface to optimize one or more of at least latency and battery life of the wireless input and output devices where the received selection provides a latency time that is less than a predetermined maximum latency between the wireless safety, security and comfort system and each of the plurality of input and output devices including the at least one device that communicates with the wireless safety, security and comfort system through the other of the plurality of wireless input and output devices.

17. The apparatus as in claim 16 further comprises an operating mode of the plurality of wireless input and output devices that is implemented in accordance with the received selection.

18. The apparatus as in claim 16 wherein the selection further comprises a operating frequency for the plurality of wireless devices.

19. The apparatus as in claim 18 wherein the selection further comprises a number of time slots on the selected operating frequency for the plurality of wireless devices.

20. The apparatus as in claim 16 wherein the latency time period further comprises a latency of the wireless input and output devices, plus a latency of the transceiver.

* * * * *